United States Patent [19]
Laksono et al.

[11] Patent Number: 5,990,910
[45] Date of Patent: Nov. 23, 1999

[54] METHOD AND APPARATUS FOR CO-PROCESSING MULTI-FORMATTED DATA

[75] Inventors: Indra Laksono, Richmond Hill; Anthony Asaro, Scarboro, both of Canada

[73] Assignee: ATI Technologies, Inc., Thornhill, Canada

[21] Appl. No.: 09/047,193

[22] Filed: Mar. 24, 1998

[51] Int. Cl.[6] .................................................. G06F 15/16
[52] U.S. Cl. .......................................... 345/503; 345/512
[58] Field of Search .................................... 345/503, 512, 345/507–509, 501

[56] References Cited

U.S. PATENT DOCUMENTS 5,797,028  8/1998  Gulick et al. ............................... 712/32
5,854,639  12/1998  Miyoshi .................................... 345/512
5,925,099  7/1999  Futral et al. ............................. 709/204

*Primary Examiner*—Kee M. Tung
*Attorney, Agent, or Firm*—Markison & Reckamp, PC

[57] ABSTRACT

A method and apparatus for co-processing multi-formatted data which begins when a host processor writes data blocks, in a substantially continuous manner, into memory. Each of the data blocks includes a plurality of data elements and each data element has one of a plurality of data formats. As the data block is being stored in memory, a co-processor retrieves selected data elements from the memory. Upon retrieving the selected data elements, the co-processor interprets them to identify the data format. If the data format is consistent with the data format of the co-processor, the co-processor processes the data element without conversion. If, however, the data format of the selected data element is not consistent with the data format of the co-processor, the co-processor converts the format of the selected data element into the format consistent with the co-processor.

20 Claims, 5 Drawing Sheets

METHOD AND APPARATUS FOR CO-PROCESSING MULTI-FORMATTED DATA

TECHNICAL FIELD OF THE INVENTION

The present invention relates generally to computers system and more particularly to co-processing multi-formatted data within computer systems.

BACKGROUND OF THE INVENTION

A computer is known to include a central processing unit, system memory, video graphics circuitry, audio processing circuitry, and peripheral ports. The peripheral ports allow the computer to interface with peripheral devices such as printers, monitors, external tape drives, Internet, etc. In such a computer, the central processing unit functions as a host processor while the video graphics circuit functions as a loosely coupled co-processor. In general, the host processor executes applications and, during execution, calls upon the co-processor to execute its particular function. For example, if the host central processing unit requires a drawing operation to be done, it requests, via a command through a command delivery system, the video graphics co-processor to perform the drawing function.

In many situations, the host central processing unit needs to know the current status of the co-processor, or co-processors, before it can continue with processing the particular application and/or before sending new commands to the co-processor. The host central processing unit obtains such status information from the co-processors via a handshaking protocol. In essence, the hosts central processing initiates the handshaking protocol by poling a co-processor to obtain its status and by poling a co-processor register to obtain the stored status. The host processor then determines whether the co-processors status has changed. If so, host processor updates the co-processor register and continues with additional processing operations. If not, the host processor waits unit the co-processor has completed the current task. Such a technique is known as poll and register writes.

To reduce the host processor's idle time while it is waiting for the co-processor, a command first-in, first-out ("FIFO") queue may be incorporated. The command FIFO stores queued commands from the host processor that are awaiting execution by the co-processor. When the co-processor is able to perform a command, it retrieves the command from the command FIFO. As the co-processor executes a queued command, it updates a co-processor register. In this implementation, the host processor needs to verify that the command FIFO is not full and still needs to read the co-processor register to determine the current status of the co-processor. If the command FIFO is relatively small, i.e., holds a limited number of commands, the host processor still experiences wait cycles while the co-processor completes the processing of a command thereby freeing space in the command FIFO.

Increasing the size of the command FIFO, such that the host processor can download as many commands as needed, may reduce the wait cycles. But, by increasing the command FIFO, the required memory is increased, as is the die area, and the cost of the co-processor.

An additional issue reduces concurrency between the host processor and the co-processor is when the co-processor is required to process data having different formats. For example, if the co-processor is a video graphic co-processor, it may be required to process a variety of graphics data having different formats. Such various graphics data includes two-dimensional images, three-dimensional images, M-PEG data, etc., each of which uses a different data format. To process the various formatted graphics data, the central processing unit pushes a processing command to a software driver that converts the command into a format that is compatible with the processing format of the video graphics co-processor. Once the software driver has converted the command, the converted command is provided to the video-graphics co-processor's command FIFO. Once the command FIFO is full, the central processor experiences wait periods since it cannot push additional commands to the software driver until the FIFO has an available entry.

Therefore, a need exists for a method and apparatus that provides co-processing of multi-formatted data with minimal wait periods and without the need for increasing the command FIFO.

DETAILED DESCRIPTION OF A PREFERRED EMBODIMENT

Generally, the present invention provides a method and apparatus for co-processing multi-formatted data. Such a process begins when a host processor writes data blocks, in a substantially continuous manner, into memory. Each of the data blocks includes a plurality of data elements and each data element has one of a plurality of data formats. As the data block is being stored in memory, a co-processor retrieves selected data elements from the memory. Upon retrieving the selected data elements, the co-processor interprets them to identify the data format. If the data format is consistent with the data format of the co-processor, the co-processor processes the data element without conversion. If, however, the data format of the selected data element is not consistent with the data format of the co-processor, the co-processor converts the format of the selected data element into the format consistent with the co-processor. With such a method and apparatus, the co-processor is performing the format conversion process. As such, the central processor's providing of data elements, which include commands, is no longer dependent on the processing of the commands by the co-processor. Thus, the central processing unit can continuously provide data elements to the memory and the co-processor may retrieve them and process them at its own rate. By breaking the dependency, the host processor and co-processor operate in a much more concurrent manner than in previous embodiments.

Figure 1:
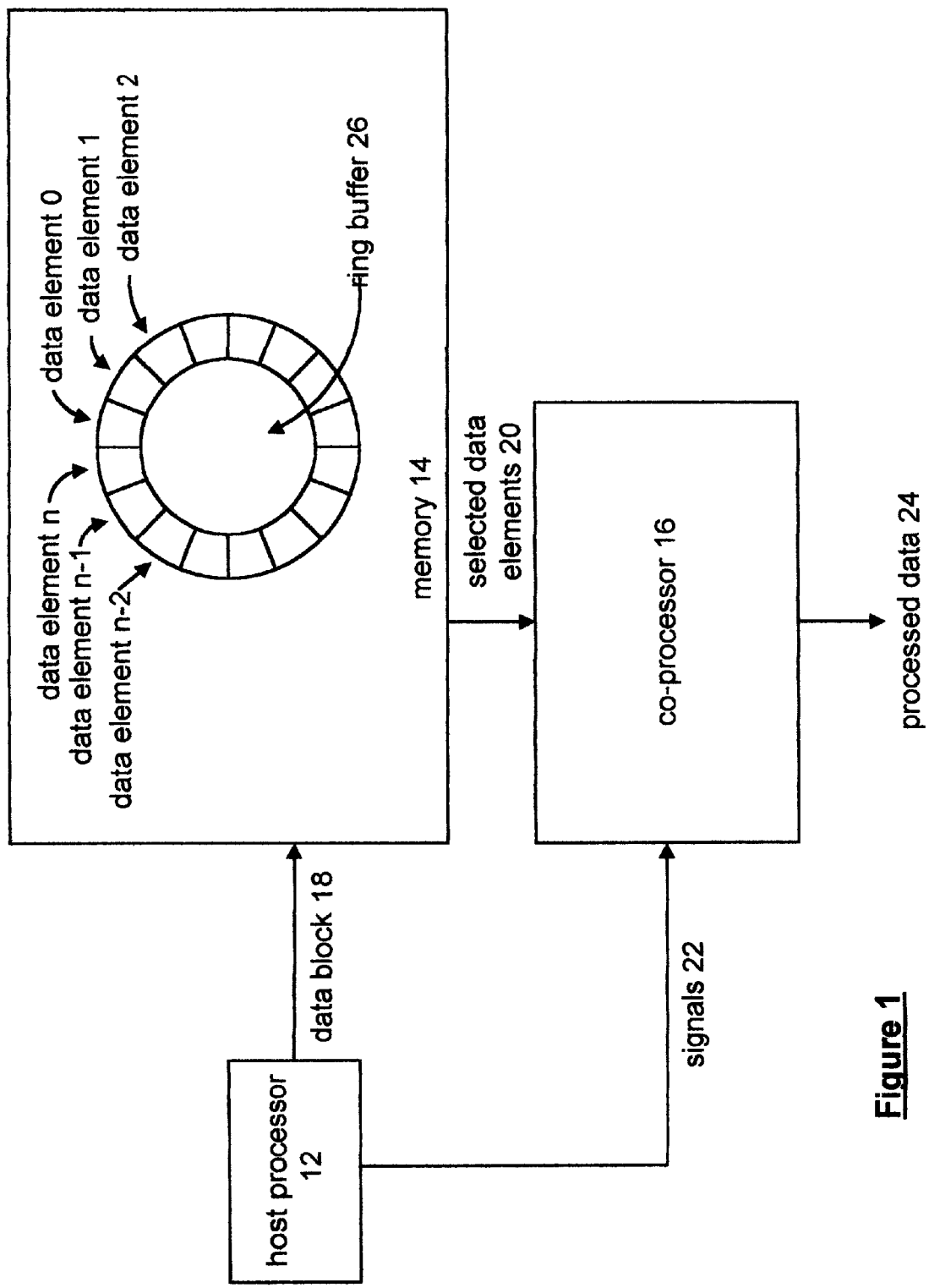
FIG. 1 illustrates a schematic block diagram of a processing system in accordance with the present invention.

The present invention can be more fully described with FIGS. 1 through 5. FIG. 1 illustrates a schematic block diagram of a processing system that includes a host processor 12, memory 14, and a co-processor 16. The host processor 12 may be a central processing unit within a personal computer, laptop computer, and/or work station, or may be a stand-alone processing device such as a micro-processor, micro-controller, digital signal processor, and/or any other device that manipulates digital information based on programming instructions. In operation, the host processor writes data blocks 16, which includes a plurality of data elements, to the memory 14. In addition, the host processor 12 provides signals 22 to the co-processor 16. The signals 22 provide instructions to the co-processor 16 indicating the manner in which the data elements are to be retrieved from the memory 14.

The memory 14 may be system memory, local memory to the host processor, local memory to the co-processor, or a combination thereof. The memory may be constructed of random access memory, floppy disk memory, hard disk memory, magnetic tape memory, CD memory, DVD memory, and/or any device that stores digital information. Further, the memory 14 is arranged in a ring buffer 26 such that the last data element n is followed by the first data element 0. In this manner, the host processor 12 writes the data elements of data block 16 into the ring buffer in a circular fashion. The writing of data into a ring buffer is known, thus no further discussion will be provided except to facilitate the understanding of the present invention.

The co-processor 16 may be a micro-processor, micro-controller, digital signal processor, processor on a video graphics card, and/or any other device that manipulates digital information based on programming instructions. The co-processor 16 retrieves selected data elements 20 from the memory based on signals 22. Upon receiving the selected data elements, the co-processor determines whether the format of the data elements are consistent with the format in which the co-processor is constructed. If so, the co-processor processes the selected data elements to produce the processed data 24. If the format is inconsistent, the co-processor 16 converts the selected data elements 20 into a format consistent with that of the co-processor 16 and produces the processed data therefrom.

The processing performed by the co-processor 16 may relate to video graphics processing wherein the data block is representative of a sub-frame, frame and/or frame grouping of two-dimensional video graphics, three-dimensional video graphics and/or digitally encoded video graphics (e.g., MPEG). Each of the video graphics types have different data formats such that the two-dimensional video graphics has one format, the three-dimensional video graphics has another format and the digitally encoded video graphics has yet another data format. As such, the co-processor, if constructed to process two-dimensional video graphics, would have to convert the three-dimensional video graphics and/or digitally encoded video graphics data elements into the equivalent two-dimensional video graphic data elements for processing. Such processing includes producing pixel data from the data elements for subsequent display on a monitor.

For example, assume that the video graphics co-processor 16 is constructed to span an object based on the start pixel of the span (e.g., DST. START) and the width of the span (e.g., DST. WIDTH). The current video image being process by the host processor, however, has a data format where the span information is provided as the start pixel and the stop pixel. As such, the co-processor 16 converts the start and stop pixel span information into start and width span information. Once converted into this format, the co-processor 16 can process the data, which, in this example, is processing the span of an object. By having the co-processor performing the format conversion, the host processor is no longer dependent upon the co-processor such that the host processor and the co-processor operate with greater concurrency.

Figure 2:
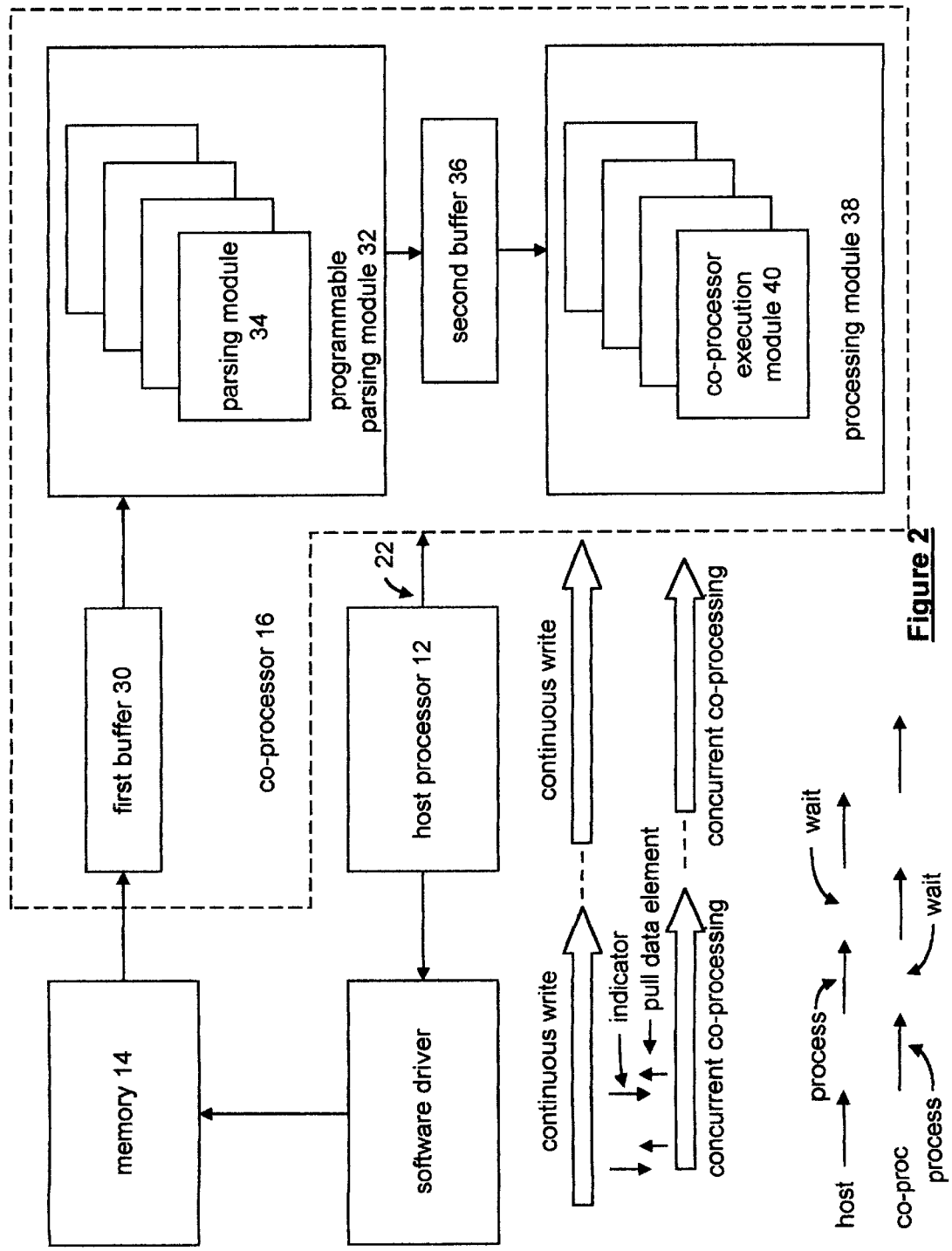
FIG. 2 illustrates a more detailed schematic block diagram of the processing system of FIG. 1.

FIG. 2 illustrates a more detailed schematic block diagram of the processing system 10. The processing system 10 includes the host processor 12, a software driver 13, memory 14, and the co-processor 16. The co-processor 16 includes a first buffer 30, a programmable parsing module 32, a second buffer 36, and a processing module 38. Also shown is a comparison between the prior art host processor and co-processor interaction (lower left portion of the Figure) and the interaction of the present invention (above the prior art illustration). The prior art process shows the host processor processing for a while and then waiting while the co-processor is processing. When the co-processor is done processing, the host processor resumes processing and the co-processor waits. The alternating of processing and waiting between the host processor and co-processor continues until the co-processor has completed its task. In contrast, the present invention allows the host processor to continually write a data block or plurality of data blocks for a given function.

The host processor also provides indications (i.e., signals 22 of FIG. 1) as to the data that it is writing to the memory. (Note that an indicator may be generated for each data element stored in memory or an indicator may be generated for each group of data elements stored in memory. For example, an indicator may be generated for every hundred triangles of an image that are provided to memory.) While the host processor is continuously writing data elements to the memory, the co-processor is pulling selected data elements from the memory. The selection of the data elements is based on the indications received from the host processor. As such, the host processor and co-processor are concurrently processing, wherein a majority of the host processor's processing time is spent writing data elements into the memory and not performing data format conversions.

The software driver 13 includes a ring buffer algorithm such that the data elements received from the host processor are stored in memory 14 in a ring buffer fashion. In addition, the software driver provides the indicators to the co-processor. Further, the software driver module 13 may include programming instructions to interpret the data elements as to their particular data format and make the conversion if necessary. While the software driver may perform this function, it is preferable to have the co-processor make such determinations since the host processor 12 executes the programming instructions of the software driver 13.

The co-processor, based on the indicators, retrieves data elements from memory 14 and stores them in a first buffer 30. The first buffer 30 may function as a command FIFO such that the co-processor 16 queues incoming commands and data elements. The data elements stored in the first buffer 30 are provided to the programmable parsing module 32, which includes a plurality of parsing modules 34. Each of the parsing modules is operable to convert the data format of one of the plurality of data formats to the data format of the co-processor. For example, one parsing module may perform the function of converting 3-D graphics data into 2-D graphics data, while another parsing module 34 may include programming instructions to convert a digitally encoded signal into the 2-D video graphics.

The converted data elements are provided to the second buffer 36 and are eventually pulled into the processing module 38, which includes a plurality of co-processor execution modules 40. Each of the co-processor execution modules 40 performs a particular function specific to the co-processor 16. For example, if the co-processor 16 is a video graphics co-processor, the co-processing execution modules 40 may include a setup engine, an edgewalker circuit, texel blending module, etc.

Figure 3:
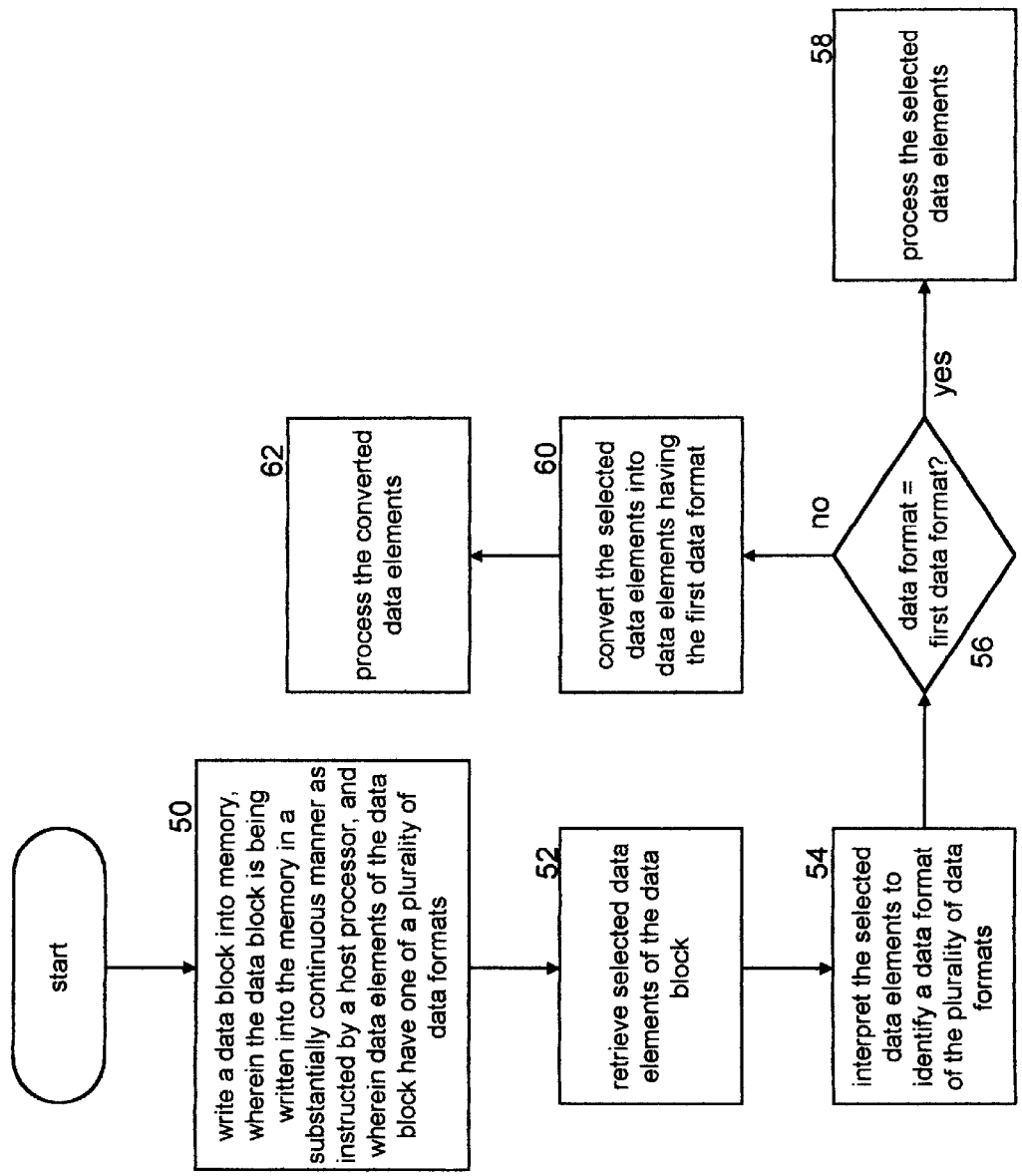
FIG. 3 illustrates a logic diagram of a method for co-processing multi-formatted data in accordance with the present invention.

FIG. 3 illustrates a logic diagram of a method for co-processing multi-formatted data. The process begins at step 50 where a data block is written into memory. The data block is written into memory in a substantially continuous manner as instructed by a host processor. The data block includes data elements that have one of a plurality of data formats. If the co-processor were a video graphics co-processor, the data blocks would include graphical data of an image and a plurality of commands for rendering the image. The data block may be for an image, a sub-frame of data, a frame of data, or a frame grouping of data, where a frame of data is representative of one screen, or window. The data formats of the data elements may be based on two-dimensional video graphics, three-dimensional video graphics and/or digitally encoded video graphics, such as DVD, MPEG 1 and 2, etc.

As an alternative to the host processor writing the data block directly into memory, the host processor may provide the data block to a software driver. Upon receiving the data block, the software driver would route the data elements to memory such that the data elements are stored in a ring buffer manner. Regardless of how the data blocks are provided to memory, they are stored in a ring buffer manner.

The process then proceeds to step 52 where a selected data element of the data block is retrieved. The retrieval of the data block may be done by a co-processor in response to receiving one of a plurality of indicators. The indicator may indicate a single data element or a group of data elements. The process then proceeds to step 54 where the co-processor interprets the selected data element to identify a data format. The process then proceeds to step 56 where a determination is made as to whether the data format equals a first data format, where the first data format is that in which the co-processor functions. If so, the process proceeds to step 58 where the co-processor processes the selected data element based on commands.

If, however, the data format of the selected data element is not that of the first data format, the process proceeds to step 60. At step 60, the data format of the selected data element is converted into the first data format. Having made the conversion, the process proceeds to step 62 where the converted data elements are processed by the co-processor.

Figure 4:
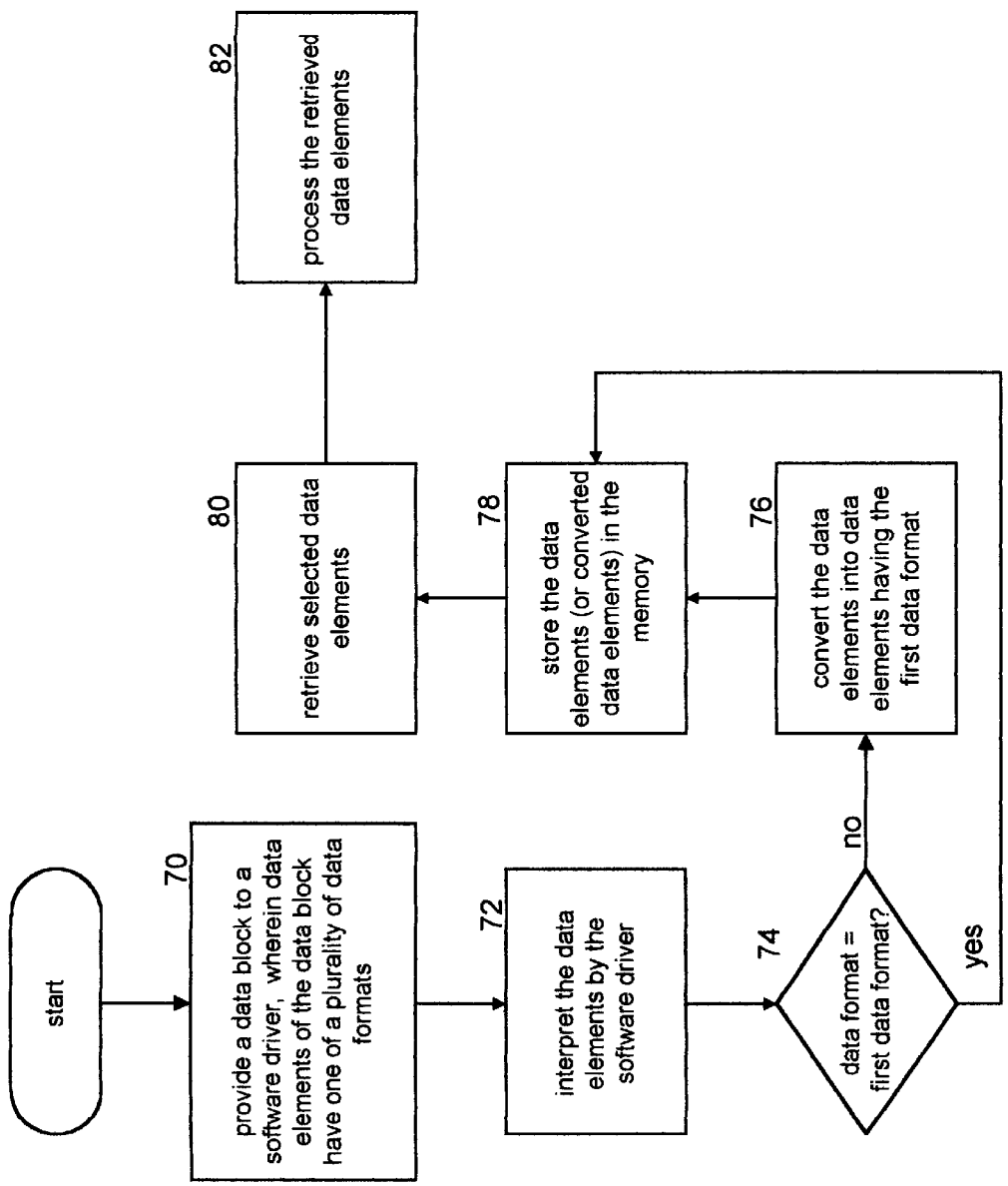
FIG. 4 illustrates a logic diagram of a method for a co-processor to perform data format conversions in accordance with the present invention.

FIG. 4 illustrates a logic diagram of an alternate method for co-processing multi-formatted data. The process begins at step 70 where a host processor provides a data block to a software driver. The data block includes a plurality of data elements that are formatted in one of a plurality of data formats. The process then proceeds to step 72 where the software driver interprets the data elements to identify a particular data format. The process then proceeds to step 74 where the software driver determines whether the data format of the data elements matches the data format of a co-processor. If so, the process proceeds to step 78. If not, the process proceeds to step 76 where the format of the data elements is converted into a format consistent with that of a co-processor.

The process then proceeds to step 78 where the data elements, or the converted data elements, are stored in memory. The process then proceeds to step 80 where the data elements that are stored in memory are retrieved by a co-processor. The process then proceeds to step 82 where the co-processor processes the retrieved data elements in accordance with commands contained within at least some of the data elements.

Figure 5:
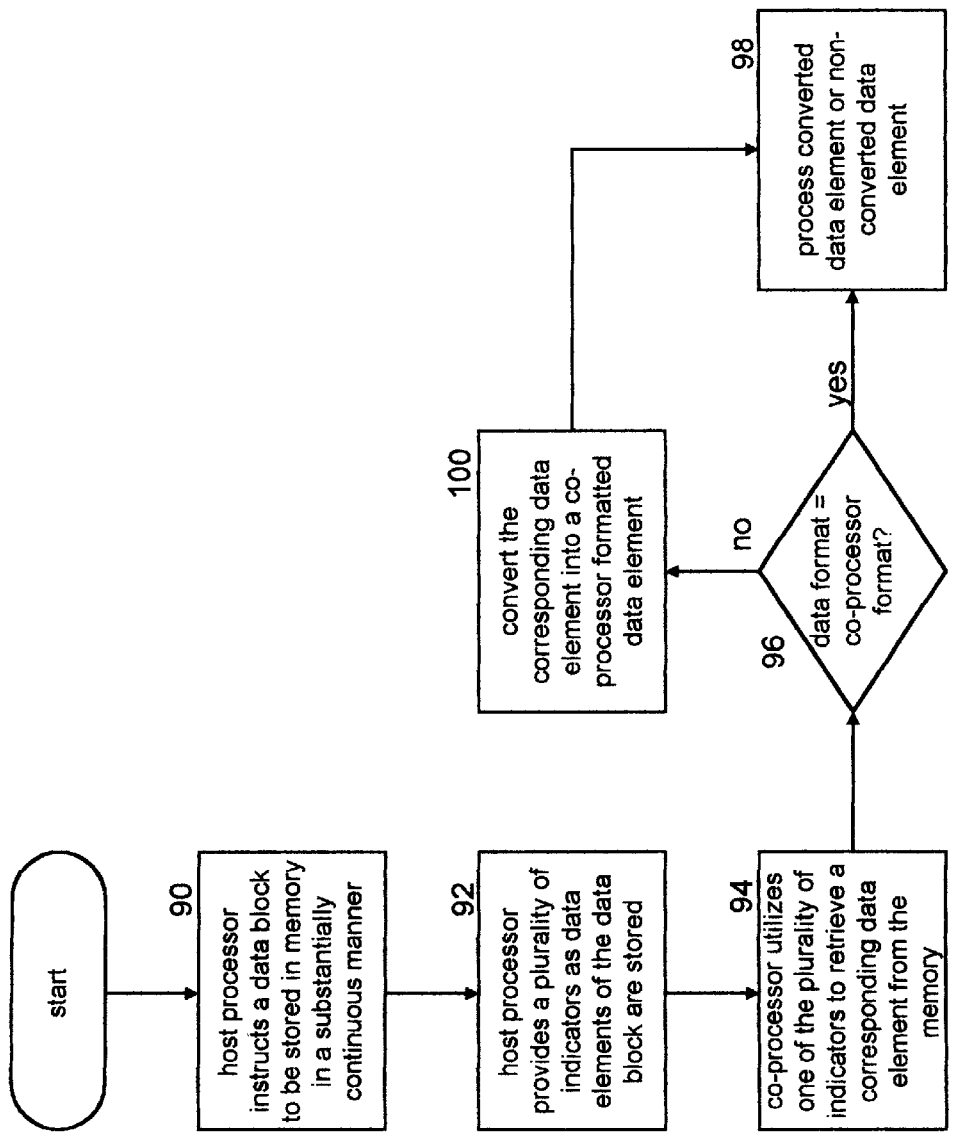
FIG. 5 illustrates a logic diagram of an alternate method for a co-processing multi-formatted data conversion in accordance with the present invention.

FIG. 5 illustrates a logic diagram of yet another alternate method for co-processing multi-formatted data. The process begins at step 90 where a host processor instructs a data block to be stored in memory in a substantially continuous manner. The process then proceeds to step 92 where the host processor provides a plurality of indicators to a co-processor. The plurality of indicators relate to the data elements as they are being stored in memory. The process then proceeds to step 94 where the co-processor utilizes one of the plurality of indicators to retrieve a corresponding data element from memory.

Upon retrieving the data element the co-processor, determines at steps 96 whether the data format of the retrieved data element matches the co-processors data format. If so, the process proceeds to step 98 where the co-processor processes the data in accordance with commands contained within at least some of the data elements. If, however, the data formats are not consistent, the process proceeds to step 100. At step 100, the co-processor converts the data format of the retrieved data element into the co-processor data format. Having done this, the co-processor processes the converted data based on the commands contained in at least some of the data processing elements.

The preceding discussion has presented a method and apparatus for co-processing multi-formatted data. By shifting the conversion of multi-formatted data external to the central processing unit, the concurrency between the central processing unit and co-processor is substantially increased. In addition, by shifting the determination into the co-processor, a substantial portion of processing time is off-loaded from the central processing unit since it does not have to perform such a conversion. As one of average skill in the art would readily appreciate, the present invention is applicable to a wide variety of co-processing environments and should not be limited to just the video graphics arena.

What is claimed is:

1. A method for co-processing multi-formatted data, the method comprises:

a) writing a data block into memory, wherein the data block is being written into the memory in a substantially continuous manner as instructed by a host processor, wherein data elements of the data block have one of a plurality of data formats;

b) retrieving selected data elements of the data block from the memory;

c) interpreting the selected data elements to identify a data format of the plurality of data formats;

d) determining whether the data format is a first data format of the plurality of data formats;

e) when the data format is not the first data format, converting the selected data elements into data elements having the first data format to produce converted data elements; and f) processing the converted data elements by a co-processor.

2. The method of claim 1, wherein the data block includes a plurality of commands for rendering an image.

3. The method of claim 1, wherein step (a) further comprises:

providing, by the host processor, the data block to a software driver; and routing, by the software driver, the data elements to the memory, wherein the memory stores the data elements in a ring buffer manner.

4. The method of claim 3 further comprises:
providing, by the host processor, a plurality of indicators;
receiving, by the co-processor, one of the plurality of indicators, wherein the co-processor utilizes the one of the plurality of indicators to retrieve the selected data elements.

5. The method of claim 1, wherein the data block is representative of a sub-frame, frame, or frame grouping of at least one of: two-dimensional video graphics data, three-dimensional video graphics data, and digitally encoded video graphics data.

6. The method of claim 5, wherein the two-dimensional video graphics data is formatted in at least one of the plurality of data formats, the three-dimensional video graphics data is formatted in at least another one of the plurality of data formats, and the digitally encoded video graphics data is formatted in at least one other of the plurality data formats.

7. The method of claim 1 further comprises:
providing, by the host processor, the data block to a software driver; and
interpreting, by the software driver, the data elements to identify the data format; and
converting, by the software driver, the data elements into data elements having the first format when the data format is not the first data format prior to the writing the data block into the memory.

8. A method for providing concurrency between a host processor and a co-processor, the method comprises the steps of:
a) instructing, by the host processor, a data block to be stored in memory, wherein the instructing causes the data block to be stored in a substantially continuous manner;
b) providing, by the host processor, a plurality of indicators as data elements of the data block are stored in the memory;
c) utilizing, by the co-processor, one of the plurality of indicators to retrieve a corresponding data element of the data block from the memory;
d) converting, by the co-processor, formatting of the corresponding data element to a co-processor data format to produce a converted data element when the corresponding data element has a data format that is inconsistent with the co-processor data format; and
e) processing, by the co-processor, the converted data element.

9. The method of claim 8, wherein the data block includes a plurality of commands for rendering an image.

10. The method of claim 8, wherein step (a) further comprises:
providing, by the host processor, the data block to a software driver; and
routing, by the software driver, the data elements to the memory, wherein the memory stores the data elements in a ring buffer manner.

11. The method of claim 8, wherein the data block is representative of a sub-frame, frame, or frame grouping of at leas one of: two-dimensional video graphics data, three-dimensional dimensional video graphics data, and digitally encoded video graphics data.

12. The method of claim 11, wherein the two-dimensional video graphics data is formatted in at least one of the plurality of data formats, the three-dimensional video graphics data is formatted in at least another one of the plurality of data formats, and the digitally encoded video graphics data is formatted in at least one other of the plurality data formats.

13. A processing system comprises:
a host processor;
memory operably coupled to the host processor, wherein the memory stores a data block in a substantially continuous manner based on writing instructions from the host processor, and wherein data elements of the data block are stored in a ring buffer manner; and
a co-processor operably coupled to the memory and to receiving signals from the host processor, wherein the co-processor retrieves selected data elements of the data block from the memory based on at least one of the signals, wherein the co-processor converts a data format of the selected data elements to produce converted data elements when the data format is inconsistent with a co-processor data format, and wherein the co-processor processes the converted data elements.

14. The processing system of claim 13 further comprises a software driver operably coupled to receive the data elements and to cause the data elements to be stored in the memory.

15. The processing system of claim 14, wherein the co-processor further comprises:
a first buffer operably coupled to receive the selected data elements;
a programmable parsing module operably coupled to the first buffer, wherein the programmable parsing module interprets the selected data elements and converts the data format of the selected data elements when the data format is inconsistent with the co-processor data format;
a second buffer operably coupled to store the converted data elements; and
a processing module operably coupled to process the converted data elements.

16. The processing system of claim 15, wherein the data block includes a plurality of commands for rendering an image, and wherein the processing module includes a rendering circuit.

17. A co-processor comprises:
a first buffer operably coupled to retrieve selected data elements of a data block from a memory in concurrence with writing the data block into the memory;
a programmable parsing module operably coupled to the first buffer, wherein the programmable parsing module interprets the selected data elements and converts the data format of the selected data elements to produce converted data elements when the data format is inconsistent with a co-processor data format;
a second buffer operably coupled to store the converted data elements; and
a processing module operably coupled to process the converted data elements in concurrence with the writing of the data block into the memory.

18. The co-processor of claim 17, wherein the data block further comprises a plurality of commands and a data stream for rendering an image, and wherein the processing module includes a rendering circuit.

19. The co-processor of claim 17, wherein the programmable parsing module further comprises a plurality of parsing modules, wherein each of the plurality of parsing modules corresponds to at least one of the plurality of data formats.

20. The co-processor of claim 17, wherein the processing module further comprises a plurality of co-processor execution units.

* * * * *